(12) United States Patent
Patel et al.

(10) Patent No.: US 12,100,235 B2
(45) Date of Patent: *Sep. 24, 2024

(54) SYSTEMS AND METHODS FOR DEEP LEARNING BASED APPROACH FOR CONTENT EXTRACTION

(71) Applicant: Yahoo Assets LLC, New York, NY (US)

(72) Inventors: Umang Patel, Sunnyvale, CA (US); Sridharan Palaniappan, Fremont, CA (US); Rofaida Abdelaal, Sunnyvale, CA (US); Chun-Han Yao, Merced, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,179

(22) Filed: Jun. 27, 2023

(65) Prior Publication Data

US 2023/0351789 A1    Nov. 2, 2023

Related U.S. Application Data

(63) Continuation of application No. 17/452,579, filed on Oct. 28, 2021, now Pat. No. 11,727,706, which is a
(Continued)

(51) Int. Cl.
*G06V 30/414* (2022.01)
*G06F 40/40* (2020.01)
(Continued)

(52) U.S. Cl.
CPC ............ *G06V 30/414* (2022.01); *G06F 40/40* (2020.01); *G06N 3/08* (2013.01); *G06Q 30/0222* (2013.01);
(Continued)

(58) Field of Classification Search
CPC ...... G06V 30/414; G06V 10/82; G06F 40/40; G06N 3/08; G06N 3/044; G06N 3/045;
(Continued)

(56) References Cited

U.S. PATENT DOCUMENTS 7,640,240 B2   12/2009   Boal et al.
2010/0260426 A1*  10/2010   Huang .................. G06F 18/217
                                                    707/E17.031
(Continued)

*Primary Examiner* — Charlotte M Baker
(74) *Attorney, Agent, or Firm* — Bookoff McAndrews, PLLC

(57) ABSTRACT

Disclosed are systems and methods for extracting content based on image analysis. A method may include receiving content including at least an image depicting a coupon; converting the received content into a larger image including the image depicting the coupon; determining, utilizing one or more neural networks, the image depicting the coupon within the larger image, wherein determining the image depicting the coupon comprises: segmenting a foreground bounding box including the image depicting the coupon from background image portions of the image; cropping the larger image based on the bounding box, wherein the cropped image consists of the image depicting the coupon; determining text included in the cropped image; and extracting information included in the coupon based on the determined text.

20 Claims, 8 Drawing Sheets

Related U.S. Application Data continuation of application No. 16/829,440, filed on Mar. 25, 2020, now Pat. No. 11,188,746.

(51) Int. Cl.
  *G06N 3/08* (2023.01)
  *G06Q 30/0207* (2023.01)
  *G06T 7/11* (2017.01)

(52) U.S. Cl.
  CPC ...... *G06T 7/11* (2017.01); *G06T 2207/20084* (2013.01); *G06T 2207/20132* (2013.01)

(58) Field of Classification Search
  CPC .................. G06Q 30/0222; G06T 7/11; G06T 2207/20084; G06T 2207/20132
  USPC ......................................................... 382/156
  See application file for complete search history.

(56) References Cited

U.S. PATENT DOCUMENTS

| | | |
|---|---|---|
| 2013/0132959 A1 | 5/2013 | Moore |
| 2017/0124564 A1 | 5/2017 | Pi Farias |
| 2020/0074014 A1* | 3/2020 | Bakir ........................ G06T 7/97 |
| 2020/0151503 A1 | 5/2020 | Wang et al. |
| 2021/0124976 A1* | 4/2021 | Kim ....................... G06V 10/82 |

* cited by examiner

SYSTEMS AND METHODS FOR DEEP LEARNING BASED APPROACH FOR CONTENT EXTRACTION

CROSS-REFERENCE TO RELATED APPLICATION(S)

This application is a continuation application of and claims the benefit of priority to pending prior U.S. Nonprovisional patent application Ser. No. 17/452,579, filed Oct. 28, 2021, which is a continuation of U.S. Nonprovisional patent application Ser. No. 16/829,440 filed Mar. 25, 2020, now U.S. Pat. No. 11,188,746, which is incorporated herein by reference in its entirety.

TECHNICAL FIELD

The present disclosure relates to systems and methods for extracting content based on image analysis.

BACKGROUND

Commercial content such as, for example, coupons, order confirmations, and travel itineraries, constitutes a major share of email communications, and may amount to billions of email messages on a daily basis, for example, to Yahoo and AOL email users. Accurately identifying key elements within the content of email in a scalable manner is of importance to both users and service providers, and may be leveraged by various applications, such as ad re-targeting, email search, and email summarization and organization. With the fast-increasing amount of advertisement in modern email services, looking through detailed contents of email may be tedious and time consuming for users. While some services provide content extraction features, such conventional content extraction features are mostly limited to text-based content with specific templates. For example, conventional approaches rely heavily on the text of HTML for content extraction and therefore have the limitations of being unable to extract image-based content. Furthermore, extracting text-based content using conventional approaches may need additional clean up, e.g., filtering, due to textual noise. Accordingly, there is a need for an improved method of extracting content based on image analysis.

SUMMARY OF THE DISCLOSURE

Embodiments of the present disclosure include systems and methods for extracting content based on image analysis.

According to certain embodiments, a computer-implemented method is disclosed. The computer-implemented method may include: receiving content including at least an image depicting a coupon; converting the received content into a larger image including the image depicting the coupon; determining, utilizing one or more neural networks, the image depicting the coupon within the larger image, wherein determining the image depicting the coupon comprises: segmenting a foreground bounding box including the image depicting the coupon from background image portions of the image; cropping the larger image based on the bounding box, wherein the cropped image consists of the image depicting the coupon; determining text included in the cropped image; and extracting information included in the coupon based on the determined text.

In accordance with another embodiment, a computer system is disclosed. The computer system may include: a data storage device (e.g., at least one memory) storing processor-readable instructions; and at least one processor configured to execute the instructions to perform a method. The method may include receiving content including at least an image depicting a coupon; converting the received content into a larger image including the image depicting the coupon; determining, utilizing one or more neural networks, the image depicting the coupon within the larger image, wherein determining the image depicting the coupon comprises: segmenting a foreground bounding box including the image depicting the coupon from background image portions of the image; cropping the larger image based on the bounding box, wherein the cropped image consists of the image depicting the coupon; determining text included in the cropped image; and extracting information included in the coupon based on the determined text.

In accordance with another embodiment, a non-transitory computer-readable medium is disclosed. The non-transitory computer-readable medium may contain instructions that, when executed by a processor, cause the processor to perform a method including: receiving content including at least an image depicting a coupon; converting the received content into a larger image including the image depicting the coupon; determining, utilizing one or more neural networks, the image depicting the coupon within the larger image, wherein determining the image depicting the coupon comprises: segmenting a foreground bounding box including the image depicting the coupon from background image portions of the image; cropping the larger image based on the bounding box, wherein the cropped image consists of the image depicting the coupon; determining text included in the cropped image; and extracting information included in the coupon based on the determined text.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

As noted above, conventional approaches of electronic content identification may rely heavily on the text of HTML for content extraction. Specifically, some approaches parse HTML text body and extract the included content. However, text-based approaches may be vulnerable to changes in HTML. Moreover, text-based approaches may be applied only to content that is text-based and may ignore any content embedded in images. In the context of the current disclosure, a "text-based coupon" may refer to a coupon including at least one image and text associated with the image, and an "image-based coupon" may refer to a coupon comprising images having embedded text. As such, conventional text-based approaches of content extraction may be applied to text-based coupons, but may not be applicable to image-based coupons.

The embodiments of the current disclosure address the problems with conventional methods of content extraction from a human-eye perspective. That is, content may be extracted based on image analysis. For example, content may be extracted based on rendered images of emails. In some embodiments, Convolutional Neural Networks (CNN) may be trained to detect individual coupons in rendered images. Subsequently, text included in the rendered images may be extracted by an Optical Character Recognition (OCR) engine. The extracted text may be labeled by a Name Entity Recognition (NER) model. An image-based approach to extract context as disclosed herein may be relatively more robust to template change and more generic across different domains as compared with conventional text-based methods and systems.

Figure 1:
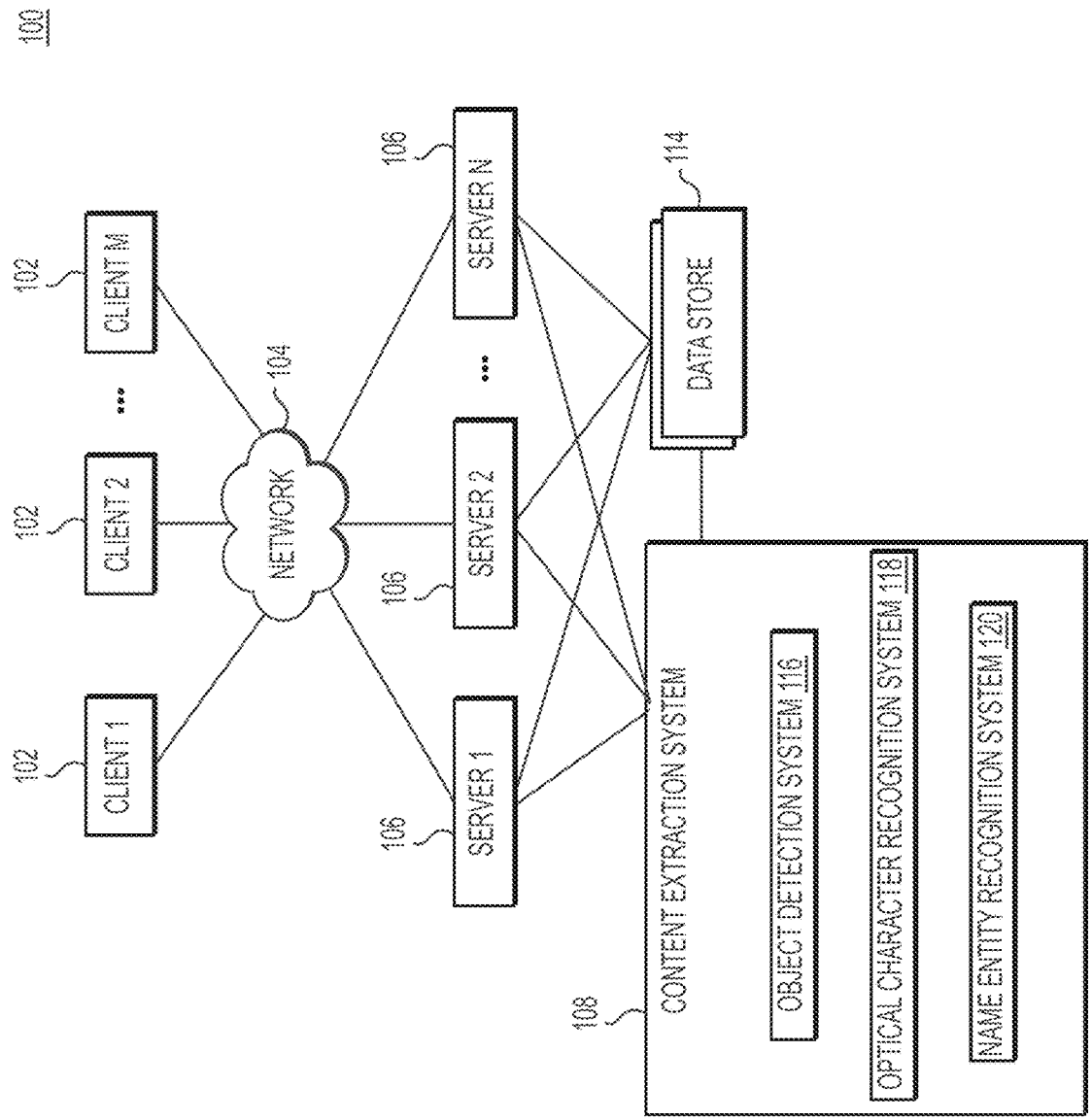
FIG. 1 depicts a schematic diagram illustrating an example of a computer network and environment within which the computer systems and methods disclosed herein are implemented according to some embodiments of the present disclosure.

FIG. 1 shows a block diagram of an exemplary electronic communications system 100 for implementing embodiments of the present disclosure, or aspects thereof. System 100 may include one or more clients 102 (e.g., Client 1, Client 2, . . . Client m). Clients 102 may be implemented with devices, and/or applications running thereon. By way of example, clients 102 may include personal computers, laptops, tablet computers, personal digital assistants, mobile telephones, smartphones, pagers, and/or other types of electronic communication devices. Clients 102 may be configured to communicate to and/or through network 104. In the context of the current disclosure, client 102 may be referred to as a user using one or more of the aforementioned devices and/or applications. In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, clients 102 may be configured to initiate electronic transaction requests. For example, electronic transaction requests may include receiving or initiating e-mail or other electronic communications, such as instant messaging, chat, text messaging, SMS messages, pager communications, blog posts, microblog posts, news items, etc. The electronic transaction requests may be generated by clients 102 and transmitted through network 104 to appropriate servers, such as, for example, servers 106.

Servers 106 may include one or more servers (e.g., Server 1, Server 2, . . . Server n) configured to interact with the network 104, one or more data stores 114, and a context extraction system 108. In addition, consistent with some embodiments, servers 106 may be implemented as a single server, a server system comprising a plurality of servers, or a server farm comprising a load balancing system and a plurality of servers. Servers 106 may be hardware, software, or a combination thereof. In some embodiments, a product and/or service may be provided to the client 102 via the servers 106. For example, the servers 106 may be web and/or e-mail servers.

Content extraction system 108 may include an object detection system 116, an optical character recognition (OCR) system 118, and a name entity recognition (NER) system 120, according to some embodiments. In some embodiments, the context extraction system 108 may be configured to extract information included in electronic transaction requests to and from clients 102.

The object detection system 116 may be configured to predict a class and a bounding box of each object detected in an image. In some embodiments, the object detection system 116 may be configured to simply predict a bounding box of each object detected in an image. In some embodiments, the object detection system 116 may employ neural network approaches (i.e., "deep learning"). A neural network may be software representing the human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a single-shot detector, a convolutional neural network, a deep neural network, or a recurrent neural network.

In some embodiments, the neural network may include region based convolutional neural networks (R-CNN). Some exemplary R-CNNs may include R-CNN, Fast R-CNN, Faster R-CNN, and/or Mask R-CNN. R-CNNs may include one or more convolutional neural network models designed for object detection within an image. For example, R-CNNs may be configured to locate all possible candidates of object by a region proposal model. In some embodiments, possible candidates of objects may be detected by predicting bounding boxes. R-CNNs may be further configured to classify each region of interest (RoI) and refine predicted bounding boxes.

In some embodiments, the neural network may include, for example, a You Only Look Once (YOLO) architecture, a Single-Shot Detector (SSD) architecture, or the like, in addition to architectures designed for image recognition like Inception, VGG, Resnet, or the like. Single-stage detectors like YOLO and SSD may formulate object detection based on a regression approach and remove the region proposal step performed by R-CNNs. Accordingly, single-stage detectors may be relatively light weighted compared to R-CNNs while preserving optimal performance. For example, YOLOv3 may be configured to run at the speed of 45 frames per second (fps) on 320×320 images.

The OCR system 118 may be configured to recognize characters and/or words in an image or a scanned file according to some embodiments. In some embodiments, the OCR system 118 may utilize one or more neural networks, such as R-CNNs and/or SSDs, to recognize characters and/or words in an image and/or file. That is, one or more neural networks may be trained to obtain an OCR model configured to recognize characters and/or words. For example, the OCR model may be trained using a synthesized data set. In some embodiments, a data set may be synthesized by placing randomly generated text at random positions in natural images, thereby enabling the OCR model to identify rotated text and apply appropriate scaling using such synthesized data sets. The trained OCR may be relatively robust compared to open source OCR engines with respect to text rotation, distortion, and random scaling. That is, the trained OCR model may be configured to recognize text and/or words of various sizes and/or random rotations. In some embodiments, the OCR system 118 may utilize an open source OCR engine that may be implemented via C, C++, Python, and/or any appropriate coding language.

In some embodiments, the text and/or words extracted from an image that had been rendered based on an HTML file may be compared with text parsed from the HTML file for validation and/or calibration of the OCR system 118. The comparison may be also be utilized to refine boundary boxes predicted by the object detection system 116, i.e., validate and/or calibrate the object detection system 116. Such validation and/or calibration may be performed online and/or offline.

The NER system 120 may be configured to perform natural language processing according to some embodiments. For example, the NER system 120 may be configured to identify names of people and institutions, and/or label lexical property of words in a text corpus. In some embodiments, the NER system 120 may perform entity prediction by embedding words into certain feature representations and learning probabilistic dependency between neighboring words. In some embodiments, the NER system 120 may utilize Long Short-Term Memory (LSTM) based models for sequence tagging, as will be described in further detail below with reference to FIG. 5. For example, such models may include LSTM networks, bidirectional LSTM (BI-LSTM) networks, LSTM with a Conditional Random Field (CRF) layer (LSTM-CRF) and bidirectional LSTM with a CRF layer (BI-LSTM-CRF).

Figure 2:
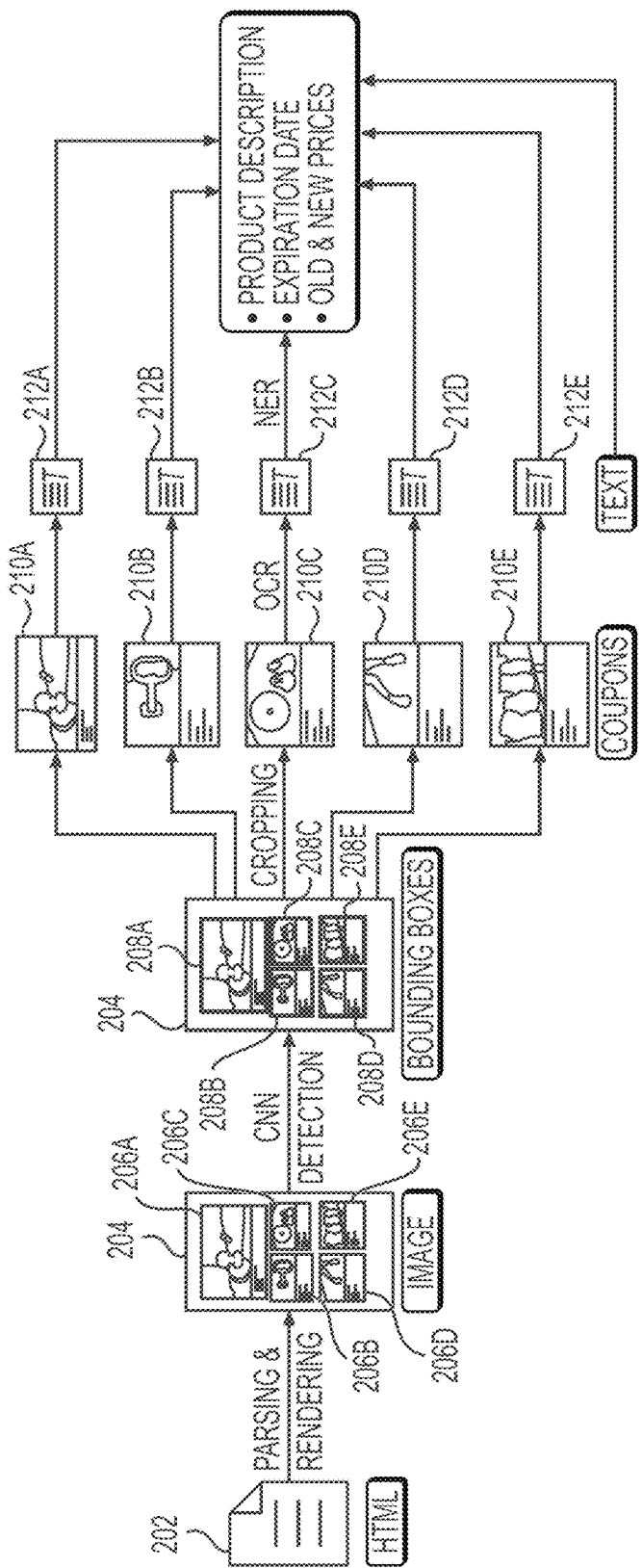
FIG. 2 depicts an exemplary method of extracting content based on image analysis according to some embodiments.

FIG. 2 depicts an exemplary method of extracting content based on image analysis according to some embodiments. As shown in FIG. 2, an HTML file 202 may be parsed and rendered as an image 204. In some embodiments, the image 204 may be displayed to a user. The rendered image 204 may include one or more image-based coupons 206A-206E.

The object detection system 116 may be configured to utilize one or more neural networks to detect the coupons 206A-206E and distinguish each detected coupon. In some embodiments, the object detection system 116 may be configured to predict a bounding box 208A-208E for each detected object, e.g., coupons 206A-206E, and classify each predicted bounding box 208A-208E into predetermined categories. In some embodiments, the one or more neural networks may be trained to obtain a semantic segmentation model to label each pixel densely to segment each semantic region. The semantic segmentation model may be configured to identify fine boundaries with large gradient of pixel intensity. Such a model may be more applicable to image-based coupons as opposed to text-based coupons as text-based coupons may have numerous blank spaces between coupons. In some embodiments, the semantic segmentation model may be trained based on general characteristics associated with coupons. For example, coupons may be compact (e.g., text and images may be densely included within coupon boundaries) and form a rectangular shape. Moreover, coupons are generally displayed to a user without overlap between adjacent coupons. Based on such coupon characteristics, the semantic segmentation model may be trained to identify and predict bounding boxes at a relatively high accuracy such that each coupon may be identified and cropped correctly, as will be described in further detail below.

The object detection system 116 may be further configured to crop the image 204 based on the bounding boxes 208A-208E to obtain one or more cropped images 210A-210E, each including a coupon 206A-206E. In some embodiments, the OCR system 118 may be configured to extract text information 212A-212E included in each of the cropped images 210A-210E. In some embodiments, the OCR system 118 may utilize an OCR model to extract characters and words from the cropped images 210A-210E, as will be described in further detail below with reference to FIG. 4. The NER system 120 may be configured to assign an entity to each extracted character and/or word, as will be described in further detail below with reference to FIG. 5. For example, the NER system 120 may be configured to utilize an NER model to determine product description, expiration date, and/or old and new prices, etc. based on the extracted text information 212A-212E from each cropped image 210A-210E.

Figure 3:
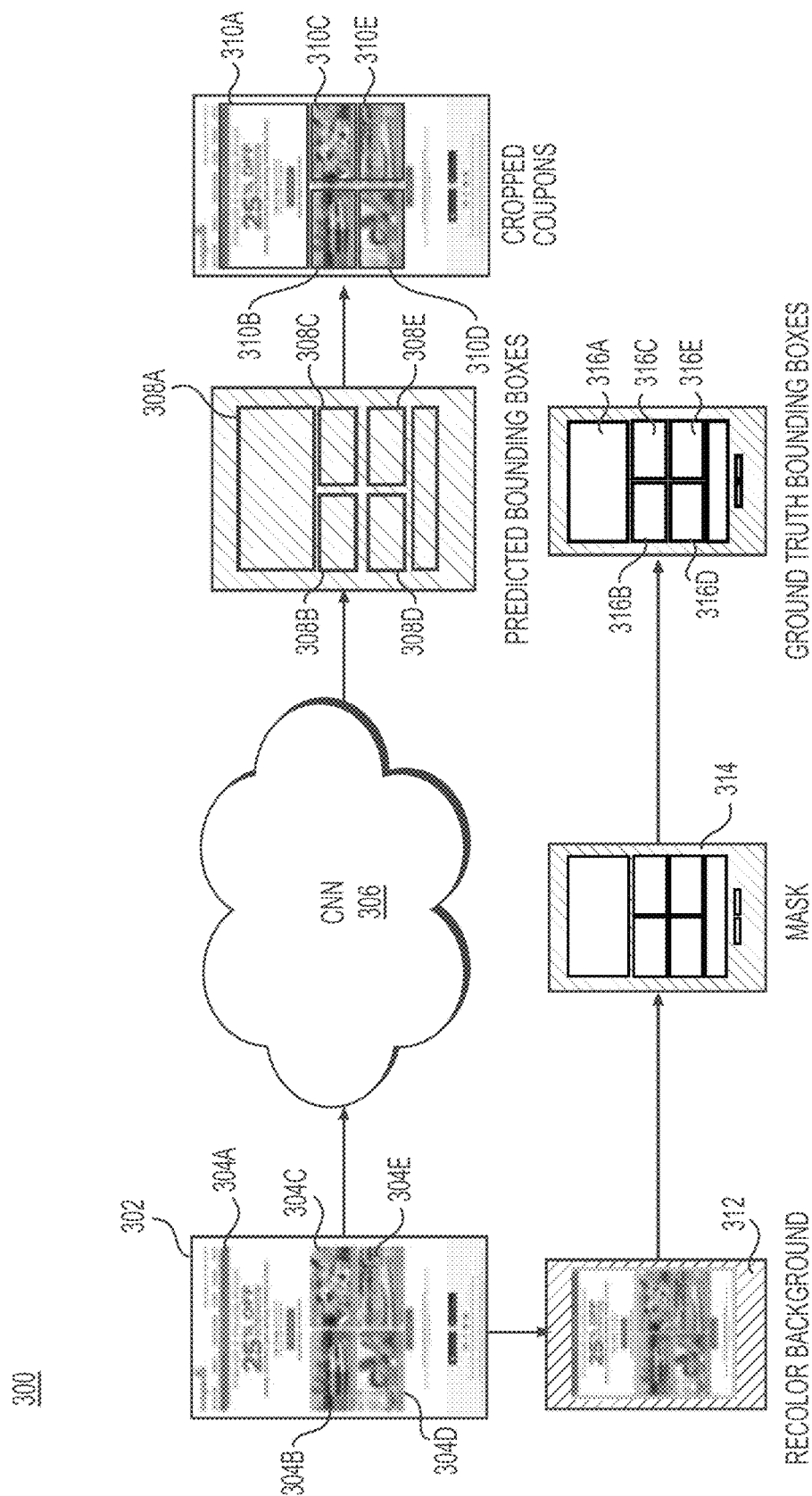
FIG. 3 depicts an exemplary method of object detection according to some embodiments.

FIG. 3 depicts an exemplary method 300 of object detection according to some embodiments. In some embodiments, the object detection system 116 may be configured to perform method 300 utilizing one or more neural networks.

In some embodiments, an image 302 including one or more coupons 304A-304E. As described above, an HTML file may be parsed and rendered to obtain the image 302 including one or more image-based coupons 304A-304E. In some embodiments, the HTML file may include one or more beacons. In the context of the current disclosure, a beacon may be a tracker provided by a content provider configured to keep track of user behavior and item popularity. Beacons may comprise various forms. For example, a beacon may appear as a 1×1 pixel in the HTML file. As another example, a beacon may be hidden in in a URL link to the HTML file. Such beacons may be triggered while rendering the image 302 and therefore may need to be removed prior to or during rendering the image. For example, one or more beacons may be removed prior to rendering an image by replacing any images, e.g., image-based coupons, including such beacons with colored rectangles. In some embodiments, such images including may be replaced with dummy images or may be removed entirely.

One or more neural networks, such as R-CNNs and/or SSDs, may be trained as a detection model configured to detect the one or more coupons 304A-304E. In some embodiments, the detection model may be trained to predict bounding boxes 306A-306E for each coupon, as will be described in further detail below.

Training the detection model may require a large amount of data with ground truth labels, e.g., ground truth bounding boxes 316A-316E, for supervision, as shown in FIG. 3. Labeling bounding boxes may be laborious work for humans, and yet automatic labeling by finding lines and blank spaces may be heuristic and limited to certain types of content. Therefore, labeling ground truth bounding boxes 316A-316E for the detection model may be performed in accordance to, but not limited to, some embodiments described below.

In some embodiments, image-based heuristics may be utilized to label ground truth bounding boxes 316A-316E. For example, images (e.g., images corresponding to one or more coupons 304A-304E) may be identified through HTML tags, and each identified image may be replaced with a pre-defined shape (e.g., rectangle for most coupons) before rendering. In some embodiments, each shape may be colored with a specific color. Accordingly, a bounding box, e.g., bounding box, may be determined based on the border of each shape. That is, a bounding box may be naively placed around each replaced shape. Subsequently, each of the bounding boxes may be expanded until there is overlap between the boundaries.

In some embodiments, segmentation based labeling may be utilized to label ground truth bounding boxes 316A-316E. In some embodiments, the one or more neural networks, such as Mask R-CNNs and/or U-Net, may be trained as a segmentation model configured to label each pixel included in the image 302 as foreground or background. The foreground pixels may then be grouped into separate components via connected component analysis, which iteratively or recursively combines adjacent foreground pixels into a component until no other pixels can be reached from any pixel in the component/ The grouped components may then be filtered to remove irregularly sized components and a bounding may be placed around each of the remaining grouped components.

In some embodiments, background recoloring and boundary enhancement may be utilized to label ground truth bounding boxes 316A-316E. In such embodiments, the background pixels, e.g., the background pixels determined by the segmentation model, may be recolored (as shown in 312) and boundary lines may be enhanced by modifying attribute values in the HTML file. For example, attributes associated with the background color, padding spaces between image-based coupons 304A-304E, and border widths may be modified in the HTML file before rendering the image 302. Accordingly, the pixels may be configured such that each pixel may be categorized as either background, coupon boundary, or coupon interior. A mask 314 may be obtained based on categorized pixels. For example, background pixels may be assigned a first value, boundary pixels may be assigned a second value, and interior pixels may be assigned a third value. Accordingly, the bounding boxes 316A-316E may be determined and labeled based on the mask 314, e.g., the boundary pixels.

The detection model 306 may be trained based on the labeled ground truth bounding boxes 316A-316E, as described above. Accordingly, the detection model may be configured to predict bounding boxes for each of the coupons 304A-304E included in the image 302. For example, the detection model 306 may divide each image, e.g., 302, evenly into rectangular grids and predict whether a coupon center lies in each grid cell by generating a confidence score and bounding box offsets based on a set of pre-defined anchor boxes with various aspect ratio. A final output may be obtained by filtering the bounding boxes with each respective confidence score and adding predicted offsets to associated anchor boxes. In some embodiments, the detection model 306 may predict bounding boxes in real time.

The image 302 may be cropped to obtain each individual coupon 310A-310E, as shown in FIG. 3. In some embodiments, the predicted bounding boxes 308A-308E may be adjusted to avoid excluding any information included in the associated coupon 304A-304E during the process of cropping the image 302. For example, boundary lines for the predicted bounding boxes 308A-308E may be adjusted to a position where adjacent pixel variance falls below a predetermined threshold. Accordingly, the image 302 may be cropped to obtain each individual coupon 310A-310E based on the adjusted boundary lines.

Figure 4:
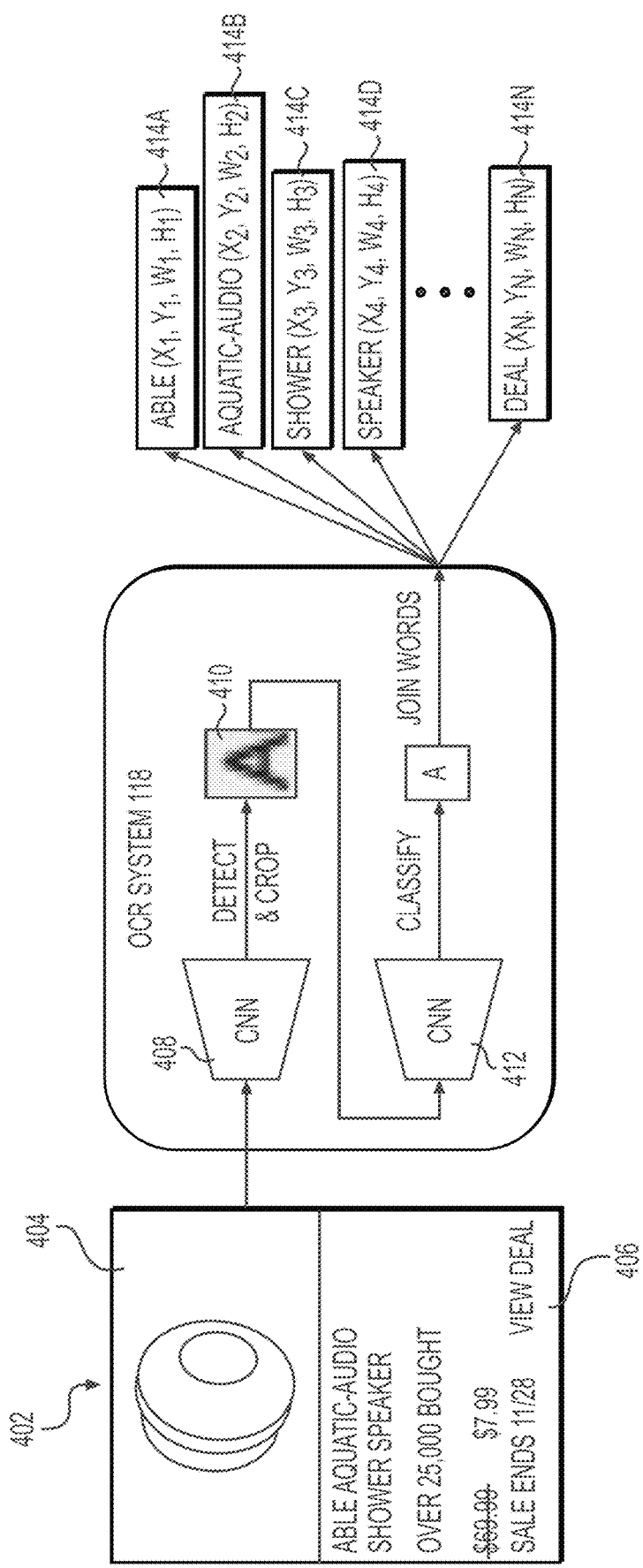
FIG. 4 depicts an exemplary method of optical character recognition according to some embodiments.
Figure 5:
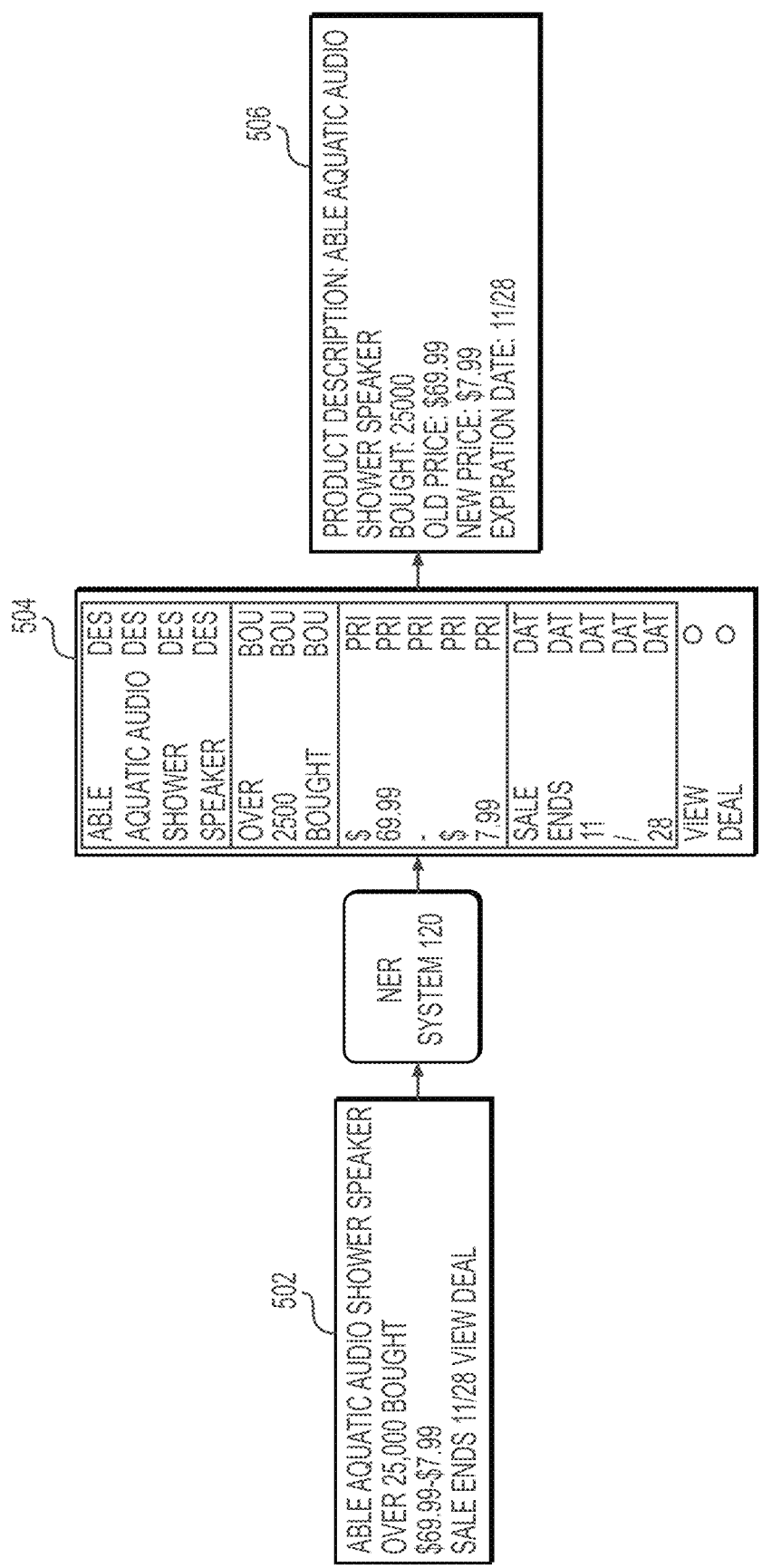
FIG. 5 depicts an exemplary embodiment of natural language processing according to some embodiments.

FIG. 4 depicts an exemplary method 400 of optical character recognition according to some embodiments. In some embodiments, the OCR system 118 may be configured to detect and recognize text included in a cropped image 402. The cropped image 402 may be an image-based coupon including a picture 404 and text 406 associated with the picture 404. In some embodiments, the OCR system 118 may utilize a trained OCR model, e.g., a CNN 408 (e.g., a trained SSD model), to detect the characters and/or words in the cropped image 402. For example, the OCR system 118 may be configured to detect the characters and/or words included in the text 406 embedded in the cropped image 402. As shown in FIG. 4, the trained OCR model 408 may be configured to crop and enlarge individual characters, e.g., the letter "A" 410. The OCR system 118 may then utilize another classification CNN model configured to classify the cropped character. The classified characters may then be joined to form words in the proper order. In some embodiments, the predicted bounding box associated with the cropped image 402 may be utilized to obtain positional coordinates of the characters 414A-414N. The X and Y coordinates shown in FIG. 4 may indicate the center coordinates of a detected word, and the W and H coordinates shown in FIG. 4 may indicate the width and height of a detected word. Accordingly, the classified characters may be placed in the proper order based on the positional coordinates, thereby forming words and/or sentences 502 as shown in FIG. 5. In some embodiments, the formed words may be refined by removing and/or concatenating overlapping words.

FIG. 5 depicts an exemplary embodiment of natural language processing according to some embodiments. In some embodiments, the NER system 120 may be configured to extract information from the formed words and/or sentences 502. In some embodiments, the NER system 120 may utilize a trained NER model configured to recognize proper nouns and/or lexical categories. The NER model may be configured to assign entity tags based on learned word properties and word dependencies. For example, labeling training data for the NER model may include classifying each line by detecting specific keywords, e.g., "$," "ends," "%," "off," etc., and then assigning an entity tag to each word accordingly. Exemplary entity tags may include 'DES', 'PRI', 'DIS', 'DAT', 'ONL', 'COD', 'BOU', 'O', which may indicate product description, price, discount rate, expiration date, online/offline, promotion code, number of bought/reviews, and none, respectively. For example, the NER model may detect keywords and obtain associated entity tags, as shown in FIG. 5 as 504. In some embodiments, the NER system 120 may concatenate the detected keywords according to the same predicted class, e.g., associated entity tags, in order to effectively extract the coupon information 506.

Figure 6:
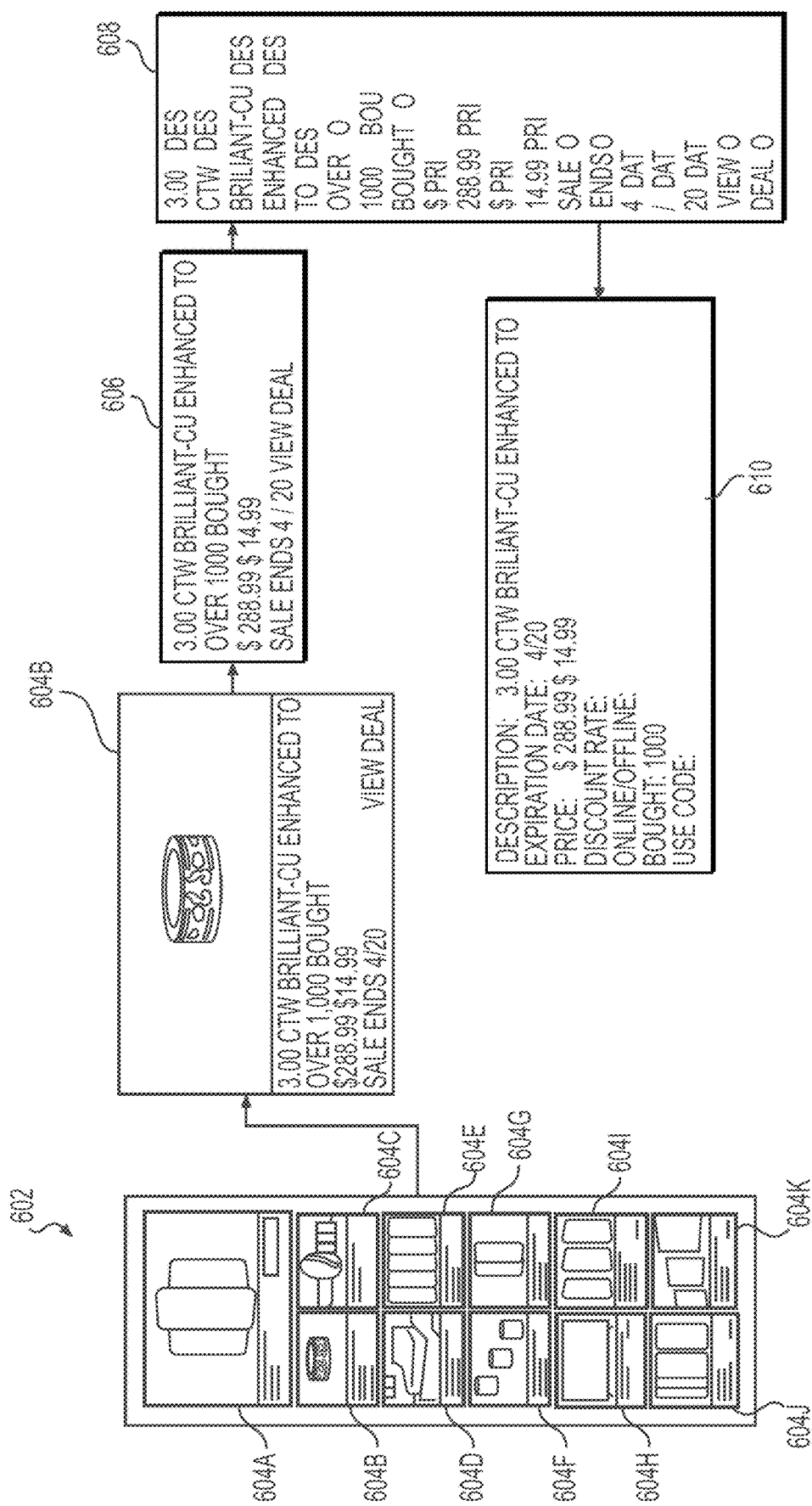
FIG. 6 depicts an exemplary application of extracting content based on image analysis according to some embodiments.

FIG. 6 depicts an exemplary application of extracting content based on image analysis according to some embodiments. As shown in FIG. 6, an image 602 may include one or more image-based coupons 604A-604K. In some embodiments, the object detection system 116 may detect and crop each of the coupons 604A-604K as described above. For simplicity, FIG. 6 is described with reference to coupon 604B. It is understood, however, that the embodiments with reference to coupon 604B may apply to each of the other coupons 604A, 604C-604K. The OCR system 118 may extract the text information included in the cropped coupon 604B as shown in 606. The NER system 120 may then detect specific keywords and obtain associated entity tags as shown in 608. The detected keywords may then be concatenated based on the same predicted class, e.g., associated entity tags, to effectively extract the coupon information 610 included in coupon 604B.

While the embodiments disclosed herein are described with reference to coupons, it is understood that the embodiments may be utilized in various applications. For example, the embodiments disclosed herein may be applied to flight itineraries. For example, the object detection system 116 may be configured to detect flight itinerary information by predicting a boundary box for content depicting tables including the flight itinerary information. The OCR system 118 may be configured to extract text information based on the predicted boundary box and the NER 120 may be configured to train an NER model to detect keywords such as date, time, locations of flights, etc. Additionally, the embodiments disclosed herein may be utilized for email clustering by extracting image features using a CNN model pre-trained on a classification dataset, and clustering the email images based on the extracted features.

Figure 7:
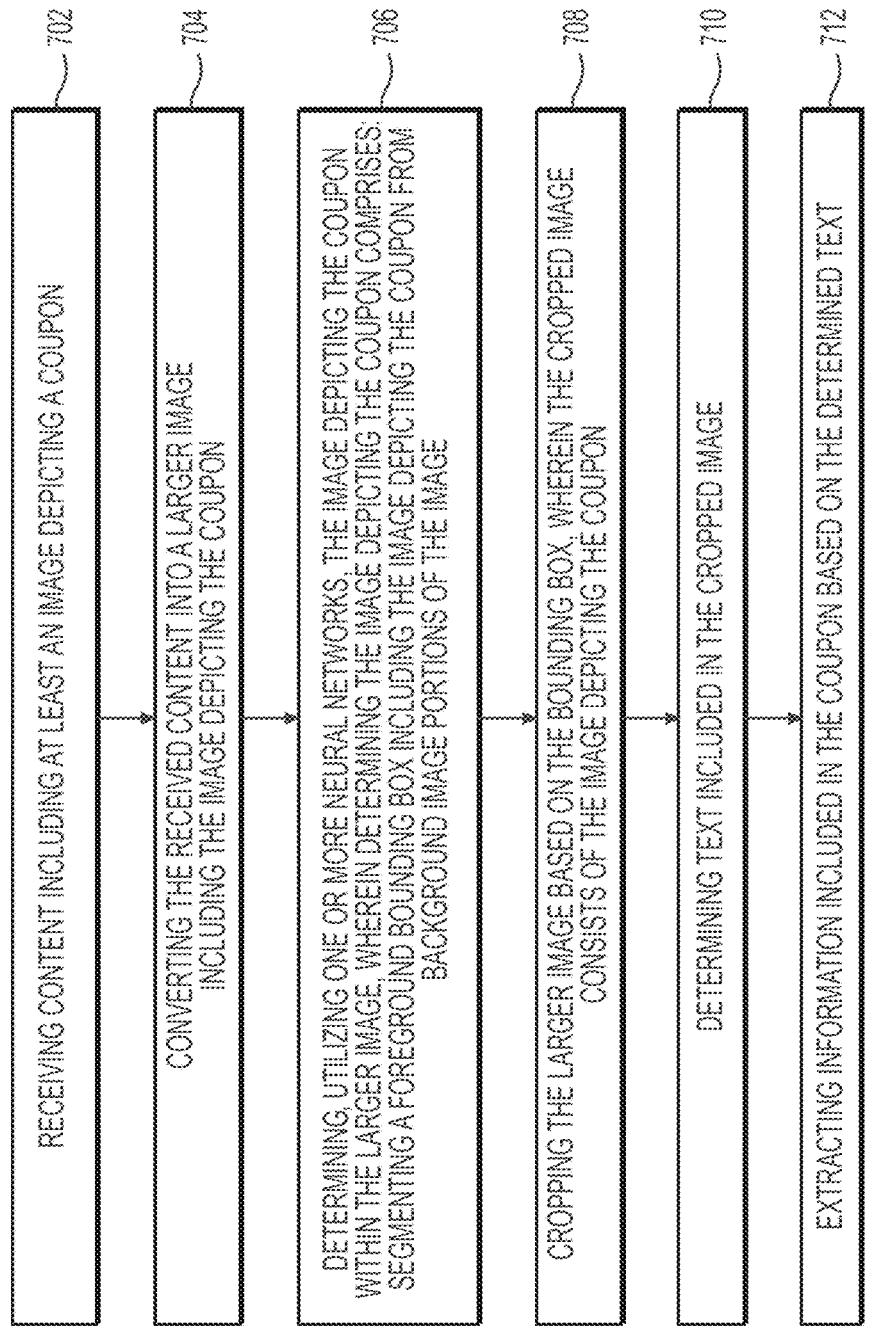
FIG. 7 depicts an exemplary method of extracting content based on image analysis according to exemplary embodiments of the present disclosure.

FIG. 7 depicts an exemplary method 700 according to some embodiments. The method 700 may begin with step 702 in which content including at least an image depicting a coupon may be received. In some embodiments, the coupon may include text and/or one or more images regarding a product and/or service. In some embodiments, the content may be received in a HyperText Markup Language (HTML) format. In step 704, the received content may be converted into a larger image including the image depicting the coupon. In step 706, one or more neural networks may be utilized to determine the image depicting the coupon within the larger image. In some embodiments, determining the image depicting the coupon may include segmenting a foreground bounding box including the image depicting the coupon from background image portions of the image. In step 708, the larger image may be cropped based on the bounding box. In some embodiments, the cropped image may consist of the image depicting the coupon. In step 710, text included in the cropped image may be determined. In some embodiments, determining text included in the cropped image may include utilizing a detection engine to determine text included in the cropped image; and utilizing a classification engine to classify the determined text. In step 712, information included in the coupon may be extracted based on the determined text. In some embodiments, method 700 may include a further step in which the extracted information included in the coupon may be displayed.

In some embodiments, extracting information included in the coupon based on the determined text may include detecting one or more predetermined words among the determined text; and assigning a tag for each detected predetermined words, wherein the tag indicates a classification for a word. In some embodiments, extracting information included in the coupon based on the determined text may include concatenating one or more detected predetermined words based on the assigned tags for each of the one or more detected predetermined words.

Figure 8:
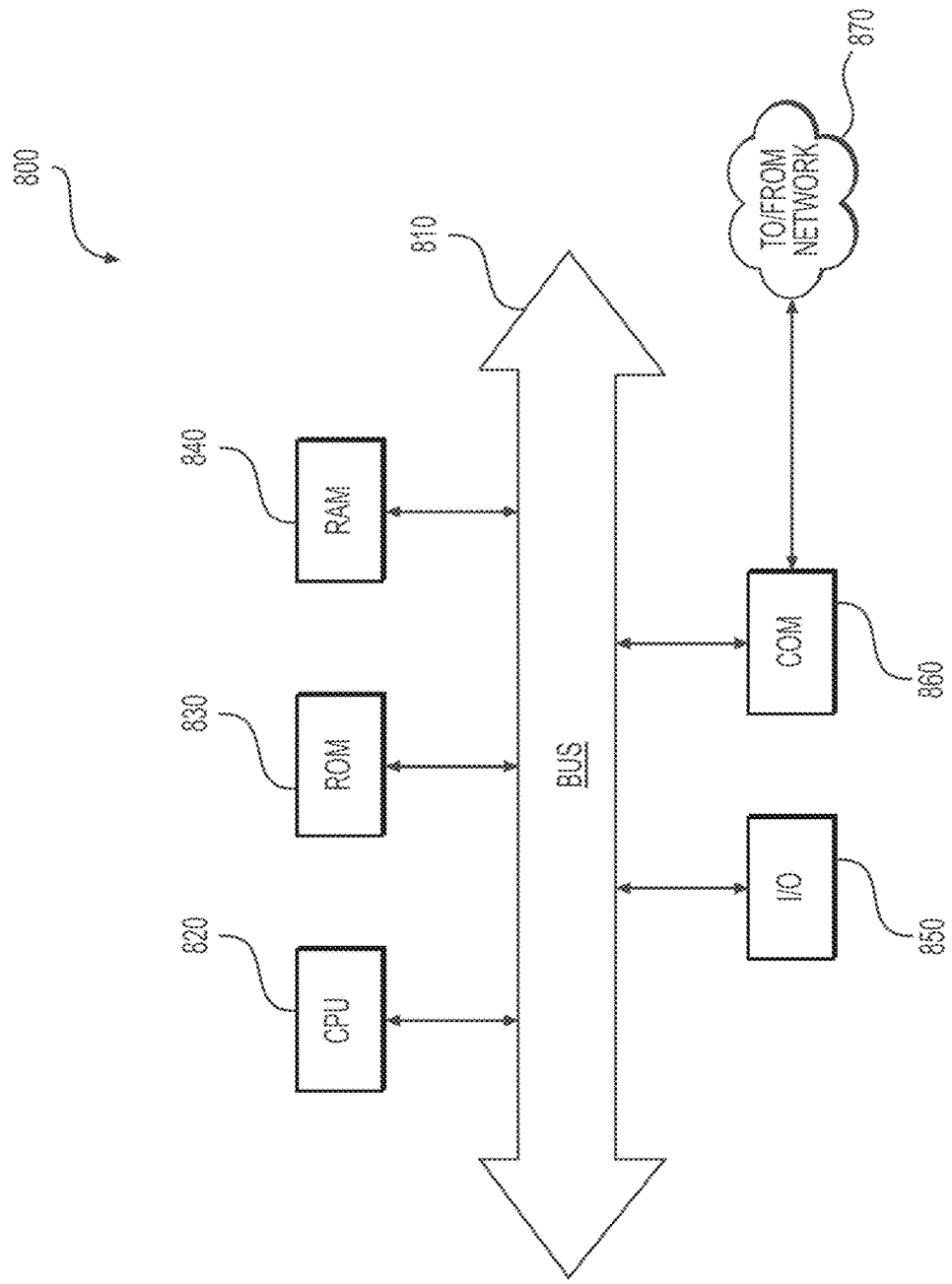
FIG. 8 is a simplified functional block diagram of a computer configured to function according to exemplary embodiments of the present disclosure.

FIG. 8 provides a functional block diagram illustration of general purpose computer hardware platforms. FIG. 8 illustrates a network or host computer platform 800, as may typically be used to implement a server, such as the one or more clients 102, servers 106, data stores 114, and the content extraction system 108. It is believed that those skilled in the art are familiar with the structure, programming, and general operation of such computer equipment and, as a result, the drawings should be self-explanatory.

A platform for a server or the like 800, for example, may include a data communication interface for packet data communication 860. The platform may also include a central processing unit (CPU) 820, in the form of one or more processors, for executing program instructions. The platform typically includes an internal communication bus 810, program storage, and data storage for various data files to be processed and/or communicated by the platform such as ROM 830 and RAM 840, although the computer platform 800 often receives programming and data via network communications 870. The hardware elements, operating systems, and programming languages of such equipment are conventional in nature, and it is presumed that those skilled in the art are adequately familiar therewith. The computer platform 800 also may include input and output ports 850 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method comprising:
receiving content including at least one image of an object;
determining, utilizing one or more neural networks, a cropping of the image, wherein the cropped image includes a depiction of the object;
determining text included in the cropped image;
extracting information based on the determined text; and
displaying the extracted information.

2. The computer-implemented method of claim 1, wherein the at least one image comprises text and/or one or more images regarding a product and/or service.

3. The computer-implemented method of claim 1, wherein determining text included in the cropped image comprises:
   utilizing a detection engine to determine text included in the cropped image; and
   utilizing a classification engine to classify the determined text.

4. The computer-implemented method of claim 1, wherein extracting information based on the determined text comprises:
   detecting one or more predetermined words among the determined text; and
   assigning a tag for each detected predetermined word, wherein the tag indicates a classification for a word.

5. The computer-implemented method of claim 4, wherein extracting information based on the determined text further comprises:
   concatenating one or more detected predetermined words based on the assigned tags for each of the one or more detected predetermined words.

6. The computer-implemented method of claim 1, further comprising
   displaying the extracted information included in the image.

7. The computer-implemented method of claim 1, wherein the content is received in a HyperText Markup Language (HTML) format.

8. A computer system comprising:
   at least one memory having processor-readable instructions stored therein; and
   at least one processor configured to access the memory and execute the processor-readable instructions to perform a method including:
   receiving content including at least one image of an object;
   determining, utilizing one or more neural networks, a cropping of the image, wherein the cropped image includes a depiction of the object;
   determining text included in the cropped image;
   extracting information based on the determined text; and
   displaying the extracted information.

9. The computer system of claim 8, wherein the image comprises text and/or one or more images regarding a product and/or service.

10. The computer system of claim 8, wherein determining text included in the cropped image comprises:
    utilizing a detection engine to determine text included in the cropped image; and
    utilizing a classification engine to classify the determined text.

11. The computer system of claim 8, wherein extracting information included based on the determined text comprises:
    detecting one or more predetermined words among the determined text; and
    assigning a tag for each detected predetermined word, wherein the tag indicates a classification for a word.

12. The computer system of claim 11, wherein extracting information based on the determined text further comprises:
    concatenating one or more detected predetermined words based on the assigned tags for each of the one or more detected predetermined words.

13. The computer system of claim 8, further comprising displaying the extracted information with the image.

14. The computer system of claim 8, wherein the content is received in a HyperText Markup Language (HTML) format.

15. A non-transitory computer-readable medium containing instructions that, when executed by a processor, cause the processor to perform a method comprising:
    receiving content including at least one image of an object;
    determining, utilizing one or more neural networks, a cropping of the image, wherein the cropped image includes a depiction of the object;
    determining text included in the cropped image;
    extracting information based on the determined text; and
    displaying the extracted information.

16. The non-transitory computer-readable medium of claim 15, wherein the image comprises text and/or one or more images regarding a product and/or service.

17. The non-transitory computer-readable medium of claim 15, wherein determining text included in the cropped image comprises:
    utilizing a detection engine to determine text included in the cropped image; and
    utilizing a classification engine to classify the determined text.

18. The non-transitory computer-readable medium of claim 15, wherein extracting information based on the determined text comprises:
    detecting one or more predetermined words among the determined text;
    assigning a tag for each detected predetermined word, wherein the tag indicates a classification for a word; and
    concatenating one or more detected predetermined words based on the assigned tags for each of the one or more detected predetermined words.

19. The non-transitory computer-readable medium of claim 15, further comprising displaying the extracted information with the image.

20. The non-transitory computer-readable medium of claim 15, wherein the content is received in a HyperText Markup Language (HTML) format.

* * * * *